(12) United States Patent
Banks et al.

(10) Patent No.: US 7,447,198 B1
(45) Date of Patent: Nov. 4, 2008

(54) LINK TRUNKING AND MEASURING LINK LATENCY IN FIBRE CHANNEL FABRIC

(75) Inventors: David C. Banks, San Jose, CA (US); Kreg A. Martin, Los Gatos, CA (US); Shunjia Yu, San Jose, CA (US); Jieming Zhu, Fremont, CA (US); Kevan K. Kwong, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1442 days.

(21) Appl. No.: 09/872,412

(22) Filed: Jun. 1, 2001

Related U.S. Application Data

(60) Provisional application No. 60/286,046, filed on Apr. 23, 2001.

(51) Int. Cl.
*H04L 12/56* (2006.01)
(52) U.S. Cl. .................. 370/386; 370/387; 370/388; 370/394; 370/327
(58) Field of Classification Search .......... 370/394, 370/218, 299, 235, 236, 244, 237, 366, 367, 370/327, 386–388
See application file for complete search history.

(56) References Cited

U.S. PATENT DOCUMENTS

| | | | | |
|---|---|---|---|---|
| 5,383,181 A * | 1/1995 | Aramaki | ................. | 370/355 |
| 5,455,831 A * | 10/1995 | Bartow et al. | ............. | 714/700 |
| 5,623,489 A * | 4/1997 | Cotton et al. | ............. | 370/381 |
| 5,649,108 A * | 7/1997 | Spiegel et al. | ............ | 709/241 |
| 6,016,310 A * | 1/2000 | Muller et al. | ............. | 370/255 |
| 6,104,696 A * | 8/2000 | Kadambi et al. | ........... | 370/218 |
| 6,285,670 B1 * | 9/2001 | Ghai et al. | ................ | 370/352 |
| 6,400,681 B1 * | 6/2002 | Bertin et al. | ............... | 370/218 |
| 6,434,145 B1 * | 8/2002 | Opsasnick et al. | ......... | 370/394 |
| 6,628,609 B2 * | 9/2003 | Chapman et al. | ........... | 370/229 |
| 6,665,295 B1 * | 12/2003 | Burns et al. | ................ | 370/389 |
| 6,785,286 B1 * | 8/2004 | O'Keeffe et al. | ........... | 370/397 |
| 2002/0131456 A1 * | 9/2002 | Lin et al. | .................... | 370/518 |
| 2005/0030948 A1 * | 2/2005 | Wyatt | ....................... | 370/392 |

OTHER PUBLICATIONS

"*Fibre Channel—Generic Services-2 (FC-GS-2);*" American National Standards Institute NCITS (Oct. 1999).

(Continued)

*Primary Examiner*—Aung S. Moe
*Assistant Examiner*—Christopher P Grey
(74) *Attorney, Agent, or Firm*—Wong, Cabello, Lutsch, Rutherford & Brucculeri, LLP

(57) ABSTRACT

In a communication network system having a multi-switch Fiber Channel fabric, adjacent switches are communicatively coupled together by a plurality of links. The links are selectively determined to join a trunked group for enabling frames received at one switch to be routed over the links in the trunked group to the adjacent switch in an evenly distributed manner. In one embodiment, a link within the trunked group is coupled to a pair of ports residing on adjacent switches each having a designated trunking master port. The traffic load at one switch is routed through the trunking master port which distributes the load across multiple links and guarantees that the load is received at the adjacent switch with "in-order" delivery.

36 Claims, 11 Drawing Sheets

OTHER PUBLICATIONS

"*Fibre Channel—Fabric Generic Requirements (FC-FG);*" American National Standards Institute (Dec. 1996).
"*Fibre Channel—Generic Services (FC-GS);*" American National Standards Institute (Aug. 1996).
"*Fibre Channel—Switch Fabric (FC-SW);*" American National Standards Institute (Oct. 1997).
"*Fibre Channel—Switch Fabric-2 (FC-SW-2);*" American National Standards Institute (Jun. 2001).
"*Fibre Channel—Physical and Signalling Interface-3 (FC-PH-3);*" American National Standards Institute (Apr. 1998).
"*Fibre Channel—Physical and Signalling Interface-2 (FC-PH-2);*" American National Standards Institute (Mar. 1997).
"*Fibre Channel—Physical and Signalling Interface (FC-PH);*" American National Standards Institute (Jun. 1994).

* cited by examiner

Calibration of DTC

LINK TRUNKING AND MEASURING LINK LATENCY IN FIBRE CHANNEL FABRIC

CROSS-REFERENCE TO RELATED APPLICATIONS

This application claims priority under 35 U.S.C. § 119(e) to U.S. Provisional Patent Application No. 60/286,046, entitled "Link Trunking and Measuring Link Latency in Fibre Channel Fabric," filed Apr. 23, 2001, the subject matter of which is incorporated by reference in its entirety herein. This application is related to U.S. patent application Ser. No. 10/135,615, also entitled "Link Trunking and Measuring Link Latency in Fibre Channel Fabric," filed Apr. 20, 2002.

BACKGROUND OF THE INVENTION

A. Technical Field

This application relates generally to routing data traffic within a communication network system, and more particularly to trunking and managing data flow paths amongst switching devices within the communication network system.

B. Background of the Technical Field

As used herein, the term "fibre channel" refers to the Fibre Channel family of standards (developed by the American National Standards Institute (ANSI)). In general, fibre channel defines a transmission medium based on a high speed communications interface for the transfer of large amounts of data via connections between a variety of hardware devices, including devices such as personal computers, workstations, mainframes, supercomputers and storage devices. Use of fibre channel is proliferating in many applications, particularly client/server applications which demand high bandwidth and low latency input/output (I/O). Examples of such applications include mass storage, medical and scientific imaging, multimedia communications, transaction processing, distributed computing and distributed database processing applications.

In one aspect of the fibre channel standard, the communication between devices is facilitated over a fabric. The fabric is typically constructed from one or more fibre channel switches and each device (or group of devices, for example, in the case of loops) is coupled to the fabric. Devices coupled to the fabric are capable of communicating with every other device coupled to the fabric.

When a communication network system includes a multi-switch Fibre Channel fabric, switches are typically coupled together by connecting their respective E_Ports to create the fabric and to enable frames to be carried between switches in order to configure and maintain the fabric. An E_Port on one (i.e., local) switch is a fabric expansion port which is communicatively coupled to another E_Port on a corresponding (i.e., remote) switch to create an Inter-Switch link (ISL) between adjacent switches. Frames with a destination, other than local to a switch or any other types of ports (i.e., N_Port or NL_Port) coupled to the local switch, exit the local switch passing through the E_Port. By contrast, frames that enter a switch through an E_Port travel to a destination local to the switch or to other destinations through another E_Port. Amongst the switches, the ISLs generally carry frames originating from a node port as well as those frames which are generated within the fabric. Additionally, ISLs are conventionally used by switches to transmit and receive frames amongst switches within the fabric, and will be understood by those skilled in the art to be point-to-point links amongst switches.

Due to limitations imposed by certain Fibre Channel protocol devices, frame traffic between a source device and a destination device must be delivered "in-order" within an exchange. Two examples of this include: protocol chips such as those used in host adapters and in storage arrays; and frames participating within a Fibre Channel exchange between a source device and a destination device. Such examples require "in-order" delivery of frames to maintain the cardinality of associated functions. The requirement for "in-order" delivery often results in frame routing techniques that entail fixed routing paths within a fabric. Although such fixed routes guarantee that all frames between source and destination ports are delivered "in-order," at least in the absence of topology changes internal to the fabric, the fixed routing paths are problematic for several reasons.

Firstly, certain traffic patterns in a fabric may cause all active routes to be allocated to certain available path(s), thereby creating a high probability for congestion through such available path(s). Given more than one path between a set of source ports and a set of destination ports, a portion of the "streams" would be allocated to each possible path. For purposes of discussion herein, a "stream" is defined as the data traffic between a single source and destination port pair. In certain combinations of streams that are active, the traffic load would be evenly distributed across the available paths, and the optimum performance (given the fabric topology) would be realized. If, however, a different collection of streams happened to be running simultaneously, a drawback arises in that all of the active streams can be allocated to a single one of the available paths, and the remaining paths would be unused. This results in a performance bottleneck, especially if the aggregation of the streams exceeded the capacity of one of the ISLs forming the path between source and destination ports.

Secondly, having traffic routed through a single available path or only certain ones of all available paths results in system inefficiency because other paths become underutilized.

Thirdly, the bandwidth of traffic flow is limited because only one path is or only a few paths are relied upon. It is noted that as the result of continuous advances in technology, particularly in the area of networking such as the Internet, there is an increasing demand for communications bandwidth. For example, there are many applications that require the high speed transmission of large amounts of data, including the transmission of images or video over the Internet, the transaction processing and video-conferencing implemented over a public telephone network, and the transmission of data over a telephone company's trunk lines. For these types of data intensive-applications to be implemented at a high rate of data transfer, high bandwidth is desirable.

What is needed is a manner in which: (1) to alleviate frame traffic congestion along particular ISLs; (2) to enable frame traffic to be evenly distributed across available ISLs so that all available paths are utilized; and (3) to improve the communications bandwidth through ISLs, all the while maintaining "in-order" delivery of frames.

SUMMARY OF THE DESCRIBED EMBODIMENTS

The present invention includes a computer-implemented method, system and computer medium and other embodiments for distributing traffic load amongst a group of links communicatively coupling a pair of adjacent switches. A set of transmit and receive ports for the group are identified as trunkable ports. The trunkable transmit ports are associated with one of the switches and the trunkable receive ports are associated with the other of the switches in the pair. A pair of ports comprising a port from each switch is designated as the pair of trunk master ports. The traffic load received at the transmit ports are queued in correspondence with a trunk master port so that the traffic load can be routed across the trunked group. By doing so, the traffic load is distributed over the links in the trunked group in an evenly-distributed manner.

Advantages of the invention will be set forth in part in the description which follows and in part will be apparent from the description or may be learned by practice of the invention. The objects and advantages of the invention will be realized and attained by means of the elements and combinations particularly pointed out in the appended claims and equivalents.

DETAILED DESCRIPTION OF EMBODIMENTS

Figure 1:
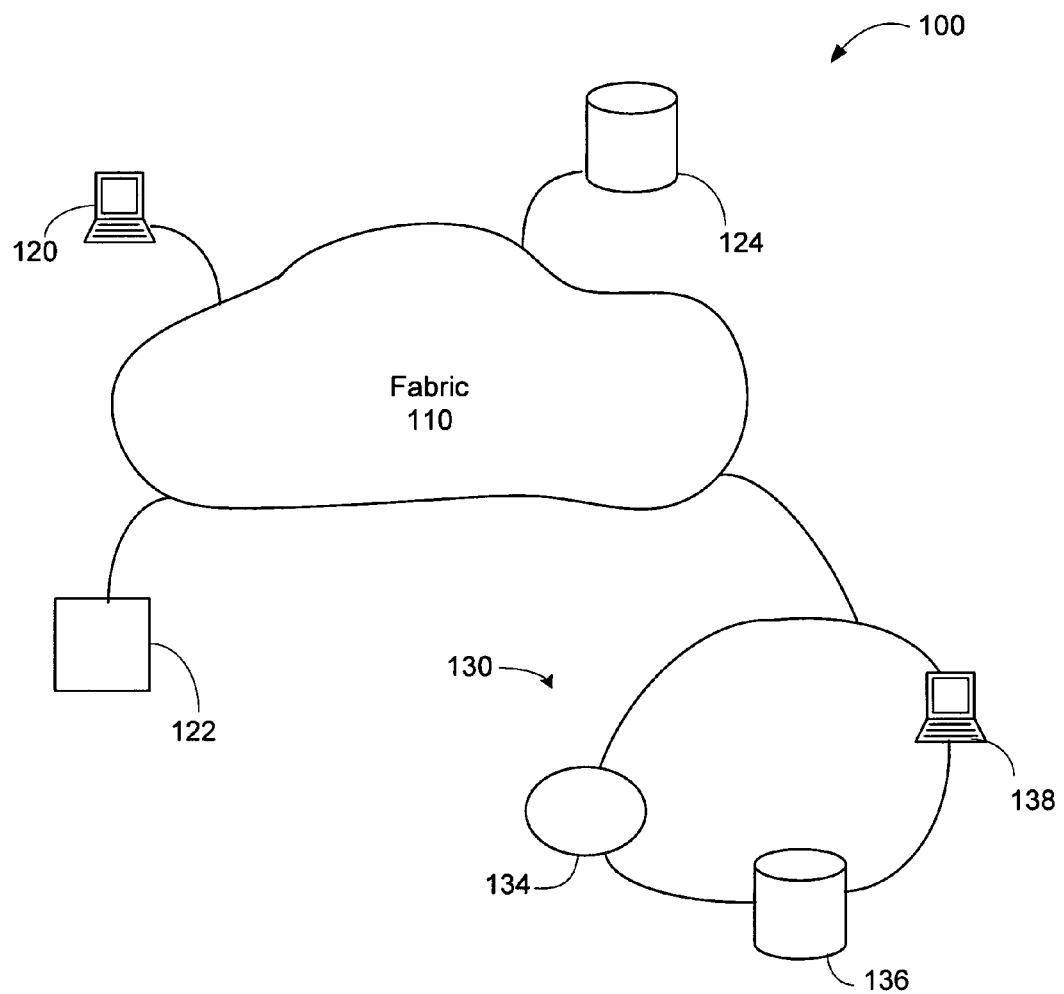
FIG. 1 is a block diagram of a communication network system having a fibre channel fabric utilizing the method of trunking and measuring one way link latency in accordance with the present invention.

A system, method, computer medium and other embodiments for link trunking and measuring link latency in a Fibre Channel fabric are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or determining" or "displaying" or the like, refer to the action and processes of a computer system, or similar electronic computing device, that manipulates and transforms data represented as physical (electronic) quantities within the computer system memories or registers or other such information storage, transmission or display devices.

One aspect of the present invention includes an embodiment of the process steps and instructions described herein in the form of a computer program. Alternatively, the process steps and instructions of the present invention could be embodied in firmware or hardware, and when embodied in software, could be downloaded to reside on and be operated from different platforms used by real time network applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus.

Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

The present invention is well-suited to a wide variety of computer network systems over numerous topologies, including storage area networking (SAN) systems. Within this field, the configuration and management of large networks comprise storage devices and computers, that are communicatively coupled to dissimilar computers and storage devices over a Fibre Channel topology.

Reference will now be made in detail to several described embodiments of the present invention, examples of which are illustrated in the accompanying drawings. Wherever practicable, the same reference numbers will be used throughout the drawings to refer to the same or like parts.

A. Multi-Switch Fibre Channel Communication Network System

FIG. 1 is a block diagram of an embodiment of a fibre channel communication network system 100 that may beneficially utilize the present invention, and may contain an embodiment of the process steps and modules of the present invention in the form of one or more computer programs. Alternatively, the process steps and modules of the present invention could be embodied in firmware or hardware, and when embodied in software, could be downloaded to reside on and be operated from different platforms used by real-time network applications. The process steps of the present invention entail the trunking and measuring of link latency in a fibre channel fabric.

The fibre channel communication network system 100 comprises a fabric 110, and a plurality of devices 120, 122, 124, and/or groups of devices 134, 136 and 138 as indicated with respect to loop 130. In general, fabric 110 is coupled to the various devices 120, 122, and 124, and acts as a switching network to allow the devices to communicate with each other. Devices 120, 122, 124 may be any type of device, such as a computer or a peripheral, and are coupled to the fabric 110 using point-to-point topology. Fabric 110 is also in communication with logical loop 130. Loop 130 includes devices 134, 136 and 138, which help to form loop 130. In a preferred embodiment, the loop 130 comprises an arbitrated loop with ring connections for providing multiple nodes with the ability to arbitrate access to a shared bandwidth.

Figure 2:
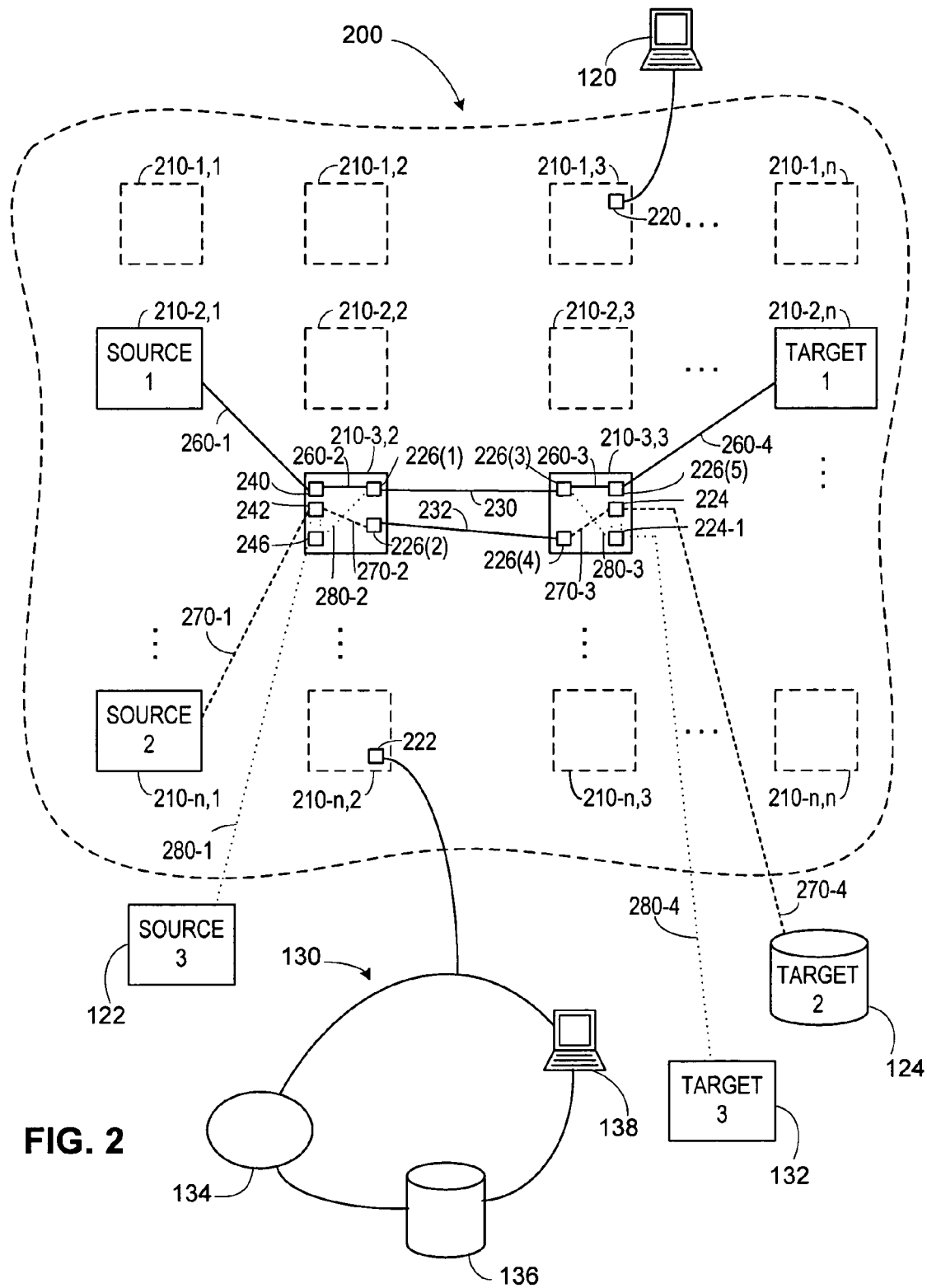
FIG. 2 is a detailed block diagram illustrating a multi-switch fibre channel fabric, which is an embodiment of the fibre channel fabric of FIG. 1.

In the described embodiments to follow, fabric 110 can embody a fibre channel network 200 (also referred to herein interchangeably as "fabric 200") made up of one or more interconnected fibre channel switches 210-1,1 through 210-$n,n$, shown in the detailed block diagram of FIG. 2. However, it is noted though, that the invention is not limited to such fabrics or to fibre channel. Switches 210-1,1 through 210-$n,n$, although possibly configured in a variety of manners so long as consistent with the fibre channel standard, will be generically referred to as "switch 210" for the purpose of general discussion herein. As illustrated, several switches 210 are depicted as dashed-boxes to indicate the potential breadth of the fibre channel network without loss of generality. Although not shown explicitly in detail, each switch 210 is coupled to another switch or device, similar to those connections explicitly shown and as understood by those skilled in the art. Within each switch 210, different types of ports support different types of connections from devices to a switch. For example, an F_Port 220 is a label used to identify a port of a fabric 200 that directly couples the fabric 200 to a single device 120, such as a computer or peripheral. An FL_Port 222 is a label used to identify a port of a fabric that couples the fabric 200 to loop 130. For the present invention, the relevant ports on switches 210, are E_Ports (e.g., 226($x$), where x=1, 2, 3, 4, 5 by way of example) as illustrated in FIG. 2. The function of an E_Port has been described previously. In general, switches 210 use the Destination ID (e.g., 24 bit) in received frames to make routing decisions. Routing tables are contained in the receiving switch port's hardware, allowing uni- and multi-cast routes to be set up independently per receive port.

As seen in FIG. 2, switch 210-3,2 includes two E_Ports 226(1), 226(2), and switch 210-3,3 includes two E_Ports 226(3), 226(4). The E_Port 226(1) is communicatively coupled to the E_Port 226(3) by an ISL 230, while the E_Port 226(2) is communicatively coupled to the E_Port 226(4) by an ISL 232. For simplicity and without loss of generality, switch 210-3,2 is depicted as utilizing at least three input ports 240, 242, 246 as seen in FIG. 2, the types of which are not explicitly shown in detail. Similarly, switch 210-3,3 is depicted as utilizing at least three output ports, 226(5), 224-1, 224 as seen in FIG. 2. Frames from sources comprising switch 210-2,1 ("source 1"), switch 210-$n$,1 ("source 2") and device 122 ("source 3") pass through switches 210-3,2 and 210-3,3 to reach their final respective destinations, namely switch 210-2,$n$ ("target 1"), device 124 ("target 2"), and device 132 ("target 3"). As shown by solid lines, frames originating from source 1 and destined for target 1 are routed through the path 260-1, 260-2, 230, 260-3, and 260-4 since ISL 230 is available. As shown in dashed lines, frames next originating from source 2 and destined for target 2 are routed through the path 270-1, 270-2, 232, 270-3, and 270-4; the reason for this route may be predetermined or may be based on ISL 232 being available and ISL 230 being busy. Although sources 1-3 have been described in the context of having originating frames to be transmitted to targets, it will be appreciated by those skilled in the art that sources 1-3 may themselves be destinations relative to other source devices, as well as relative to the target devices, too. As such, it will be recognized that frames can travel bi-directionally along the paths in the fabric.

In one situation, if ISL 232 were to become inoperative (e.g., through hardware failure), frames originating from source 3, as shown in dotted lines, and destined for target 3 are routed through the path 280-1, 280-2, 230, 280-3, and 280-4. Because ISL 232 is inoperative, the frames from sources 1 and 3 must share part of the routing through ISL 230. The congestion along ISL 230 and the unused ISL 232 are problematic for the reasons already discussed. Furthermore, it will be apparent to those skilled in the art that the previously mentioned drawbacks associated with congestion over one or a few ISLs exists especially if the total number of ISLs is greater than the two (i.e., 230, 232) in this embodiment. In another situation, if traffic through ISL 230 results in heavy congestion thereon, while traffic on ISL 232 is very light, it would be ideal to balance the traffic load over ISLs 230, 232 so as to avoid ISL 232 being underutilized.

In another situation, congestion might occur even when ISL 232 is operational and there is no issue of inoperative hardware being present. To illustrate how trunking may be beneficial, an example will now be discussed focusing on congestion arising in a situation where the hardware is operational. In the example, the following assumptions are made: source 1 uses ISL 230 to reach target 1; source 2 uses ISL 232 to reach target 2; and source 3 uses ISL 230 to reach target 3. Without the use of trunking, the use of ISLs 230, 232 is fixed in order to ensure in-order delivery of frames. Congestion will arise in the following situation, where: the path from source 1 to target 1 is active; the path from source 3 to target 3 is active; and attempting transmission is undertaken at a rate which exceeds that of a single ISL 230. Essentially, transmission along ISL 230 will be throttled by the rate at which ISL 230 can transfer frames, thereby potentially resulting in congestion over ISL 230. Moreover, this congestion will occur even if there is no traffic from source 2 to target 2 in progress at the same time.

It is understood that the examples discussed herein are purely illustrative. For example, referring back to FIG. 1, fabric 110 may comprise a single switch or a large number of switches. Exemplary switches that are well-suited for use with the present invention include those manufactured by Brocade Communication Systems, Inc. These and other comparable switches enable server computers to be communicatively coupled with storage devices through a SAN system, creating a reliable, highly available, and scalable environment for storage applications. Each switch comprises ports to which devices may be coupled thereto. In one embodiment, these ports are implemented on Application Specific Integrated Circuits (ASICs, used interchangeably with "chip") that may be affixed to hardware components (e.g., circuit boards and modules accommodating ICs), which may be plugged into or removed from a switch. Additionally, universal ports that are compatible with a variety of port types (e.g., E_Ports, F_Ports, FL_Ports) may be included within each switch 210. The composition and configuration of switches 210 and devices shown in FIG. 2 are merely illustrative. Other port combinations could be used to couple the switches together to form fabrics 110 and 200. As will be readily appreciated by those skilled in the art of fibre channel, each switch 210 includes a copy of the information defining configurations. Since each switch maintains its own copy of the configuration information, a single switch failure will not necessarily interrupt communication amongst other devices within the fabric.

Figure 3:
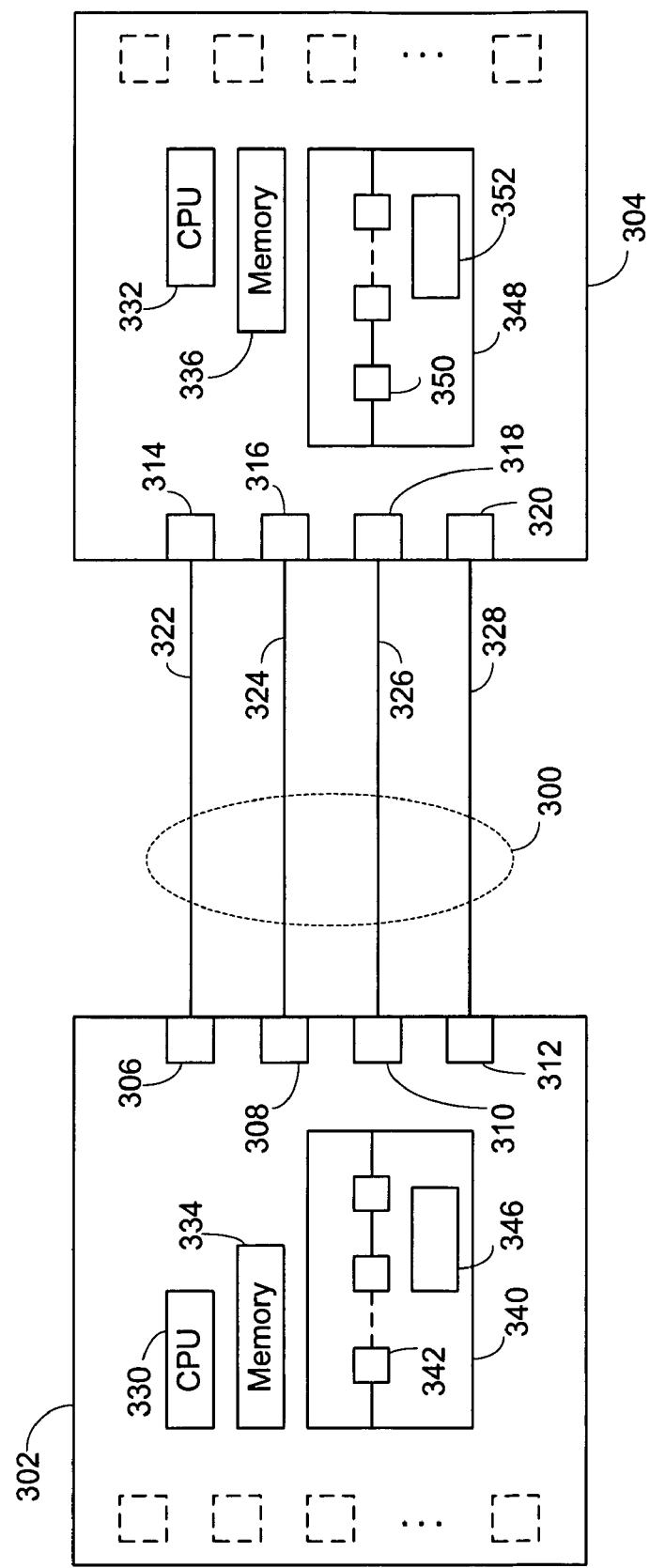
FIG. 3 is a detailed block diagram illustrating one embodiment of a trunk group having ISLs communicatively coupling adjacent switches.

FIG. 3 depicts a block diagram illustrating an embodiment of adjacent switches which work suitably-well with the described embodiments of the present invention to overcome the drawbacks associated with conventional fixed path routing of frames along ISLs connected amongst the adjacent switches. As shown, switches 302, 304 are similar to switches 210-3,2 and 210-3,3, respectively, and are coupled together via a set of links (ISLs) referred to as a trunked group 300. Frames are distributed across a set of available paths (ISLs) linking adjacent switches 302, 304. It is noted that no buffering is required in the paths between the switches 302, 304 to perform the load sharing optimizations in accordance with the present invention. Further, both load sharing facilities amongst the switches 302, 304 can be used with standard optical or copper cables and media interfaces. One technical advantage of the present invention is that there is no requirement to use specialized optical or copper ribbon cables and unusual connectors between switches in order to achieve the desired functionality. For illustrative purposes, although switches 302, 304 are each shown with four E_Ports, namely 306, 308, 310, 312, 314, 316, 318, and 320, it will be apparent to those skilled in the art that any number of E_Ports may reside on a switch as determined by the hardware constraints of the particular switch. Accordingly, in this embodiment, switches 302 and 304 may be communicatively coupled together by up to four ISLs, 322, 324, 326, and 328. Although trunked group 300 is shown to include the four ISLs 322, 324, 326, and 328; however, the determination as to whether each ISL 322, 324, 326 and 328 becomes a part of trunked group 300 is an aspect of the present invention and will be discussed below.

Figure 10A:
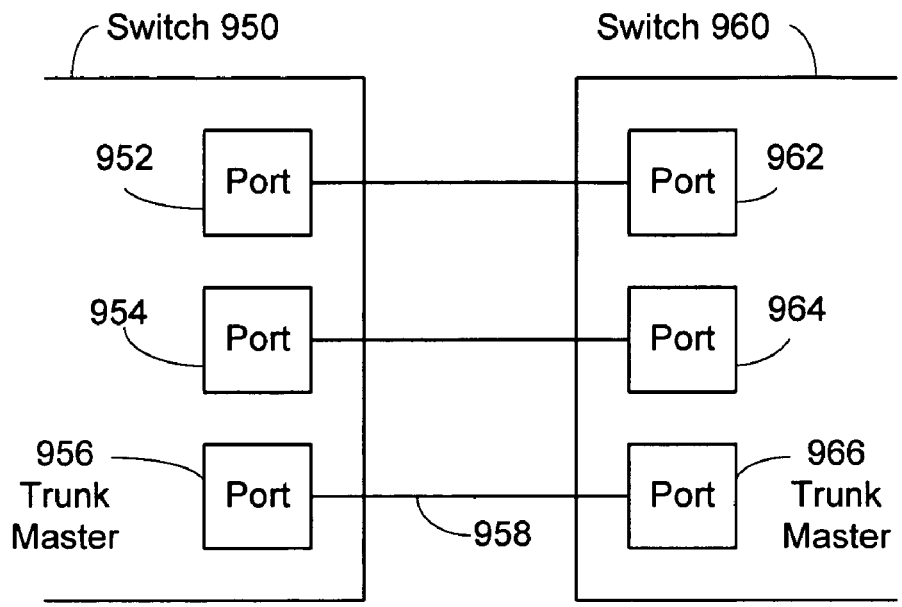
FIG. 10(A) is a block diagram showing a pair of trunking master ports on initiator and target switches sharing the same ISL.
Figure 10B:
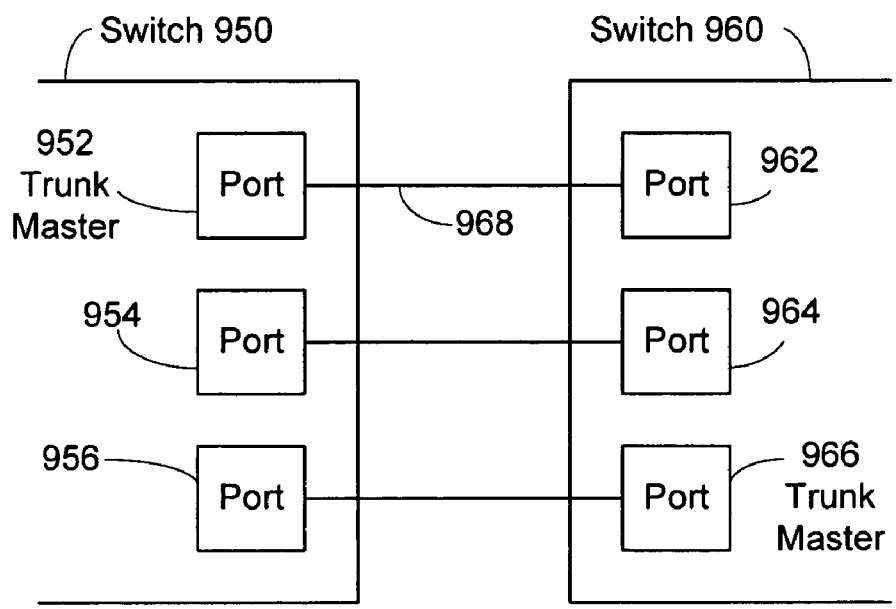
FIG. 10(B) is a block diagram showing a pair of trunking master ports on initiator and target switches, which do not share the same ISL.

In general, trunking treats a group of ISLs as a logical pipe. By doing so, frames received at one switch may be transmitted to an adjacent switch after being evenly dispensed over each of the ISLs within the trunked group, so that congestion over particular ISL(s) and underutilized ISL(s) are prevented. Trunking is beneficial for a number reasons. For example, it enables frame traffic to be evenly distributed across available ISLs while preserving in-order delivery. Ports 306 through 320 that belong to the trunked group 300 are referred to herein as trunking ports 306 through 320. At a minimum, only one of these trunking ports on each of switches 302, 304 (collectively a pair of ports) can be used to configure all routing paths for the entire trunked group 300. The particular port pair is referred to in the described embodiments as the Trunk Master ports (used interchangeably with "trunking master ports" herein). Each switch 302, 304 independently designates a particular port within itself as the trunking master port. For example, and according to one embodiment, the pair of Trunk Master ports 956, 966 may comprise those ports coupled to the same ISL 958 as shown in FIG. 10(A); however, it will be appreciated that other pairs of ports between adjacent switches can be selected as the pair of Trunk Master ports. For example, a pair of Trunk Master ports 952, 966 may comprise those ports shown in FIG. 10(B). While one aspect of the present invention is to establish as large a pipe as possible based on hardware constraints so as to improve communication bandwidth, it is a further object to guarantee "in-order" delivery of frames traveling over the trunked group 300.

FIG. 3 also illustrates that each switch 302, 304, (and 210 although not explicitly shown) includes a central processing unit (CPU) module 330, 332 integrated therein, which controls the initialization of the switch. These CPU modules 330, 332 typically include some sort of processor used with a local memory module 334, 336. Once the switches are initialized, the CPU module 330, 332 and the local memory 340 are generally not necessary for the operation of the switches 210, 302, 304 within fabric 200. Still referring to FIG. 3, additional components 340, 348 can be included (e.g., queues 342 and 350; clock timers 346 and 352; additional memory, registers, logical routing tables and lists), which will be described subsequently. The additional components 340 may be embodied within an ASIC embedded within each switch 210, 302, 304.

B. Overview of Trunking at the Fabric Logic Level

During fabric initialization, one aspect of the present invention enables a pair of switches to agree on which set of links (ISLs) is to be combined into a trunked group through, by way of example, a firmware-driven process. Each switch then sets up its routing tables and Transmit (TX) Queuing logic 342 (used interchangeably with "queue 342") to cause the set of trunked transmit ports to use the frame queues 342 of only one of the transmit ports, namely that of the Trunk Master (transmit) port.

The routing table entries of all other ports in the switch are set up to send frames, destined for the trunked group, to the Trunk Master (transmit port). As frames are received from other ports, entries are placed in the list structures of the TX Queuing logic 342 for the Trunk Master (transmit) port. The TX Queuing logic 342 for all ports in the trunked group use the list structures from the Trunk Master (transmit) port to determine frame selection, that is, which frames to send, allowing each port in the trunked group to send any frames from the set of lists across any of the links in the trunk.

Conventionally, out-of-order delivery of frames between end-point source and destination ports can occur due to skew between links in a trunked group. Delivery of frames out of the originating order could also be caused by variations in service times for received frames in the Receive (RX) Queuing logic 350 at the receiving end of a trunked set of links. To avoid these effects, the trunking logic in the TX Queuing logic 342 includes a timer 346 that binds a particular list in the Trunk Master (transmit) port to a particular link in the trunked group for a time period sufficient to ensure "in-order" delivery across multiple links. In addition, switch 304 adds RX Queuing logic 350, including circuitry, to guarantee that frames across multiple ports are queued in the order in which they are received (although this is also subject to other port-to-port skew contributions that may be implemented in a receiving switch).

To determine the minimum amount of time required to bind a list to a link, the switch software determines the difference in latencies through multiple ISLs within a potential trunked group. A maximum inbound frame processing time differential between receiving ports can be determined, and this quantity is added in the group to obtain the magnitude of the total frame delivery skew between paths; an embodiment for doing so will be discussed subsequently in a discussion on calibrating the Deskew Timer Constant.

In the described embodiments, it is preferable that each fibre channel port on the switches include an independent copy of information preferably stored in a Deskew Time Constant (DTC) register. One embodiment for implementing the DTC register includes a 16 bit register with 8 bits used to represent the Deskew Time Constant, namely the number of clocks (e.g., at 106.25 MHz) for which the deskew timer runs. On those switches that include a programmable timeout constant register as part of the additional components 340, 348, the time during which a list is bound to a particular transmit port can be defined. There are several performance advantages for minimizing the link-to-link skew and allowing the binding time constant to be variable. For example, suppose a number of relatively large frames are available to be transmitted from the same queuing list at the same time. At some point, the first frame may begin transmission on one link. Subsequently, even though the first frame is in progress, a second frame may be transmitted across another link in the group after the binding timeout period expires. If the binding time is small, the delay between transmission of multiple frames from a given list across different links can be minimized, allowing the transmit queue to be drained that much more quickly, thereby relieving switch congestion more rapidly.

It will be understood that the timers 346 used by the TX Queuing logic 342 preferably have a maximum duration that limits the total cable-to-cable skew. Since the switch software can measure the link-to-link skew during initialization, it will also have the capability of ensuring that the maximum skew specification is not exceeded. If the difference in line lengths exceeds that supported by the trunking logic, the ISLs can still be used, but they cannot be combined into a trunked group.

It is preferable to ensure that all frames associated with a particular "stream" between a source and destination device go through the same lists in the queuing logic to maintain "in-order" delivery. To facilitate this aspect, the RX Queuing logic 350 also utilizes the concept of the Trunk Master port. However, in this case, as frames are received from trunked links, the RX Queuing logic 350 places the frames into lists as if they were all received from the Trunk Master (receive) port (e.g., one of 314-320 for switch 304). To preserve in-order delivery, all frames which must maintain ordering with respect to one another should be processed through a single list (e.g., queue) in the destination switch. Frames for which no ordering requirement is imposed (e.g., frames to different destination devices) may use separate lists, because the ordering does not need to be maintained in this situation.

By associating deskewing timers binding transmit lists to a physical port until the link skew is accommodated, all frames from a particular list will be delivered at the destination switch "in-order" across the set of trunked links (ISLs). Combining this aspect of binding transmit lists to a physical port with the consistent use of lists in the transmit and receive paths for frames which must remain "in-order" ensures the preservation of delivery order through the fabric.

Frames that arrive at switch 302 are placed into a logical queue 342 as previously discussed. In order to improve communication efficiency over the ISLs, the frames are dispersed evenly amongst the ISLs within the trunked group, with the restriction that a particular list in the Trunk Master transmit port is bound to a particular ISL for a time-period sufficient to enable all frames to arrive at the target switch 304 with "in-order" delivery. Accordingly, it will be appreciated that the binding time (i.e., time delay) is a function of the difference in latency between ISLs, that is, the difference in time across the ISLs. By incorporating this delay at the transmitting switch, the actual total time required to traverse an ISL does not affect the order in which frames across different ISLs arrive at the destination switch.

Figure 11:
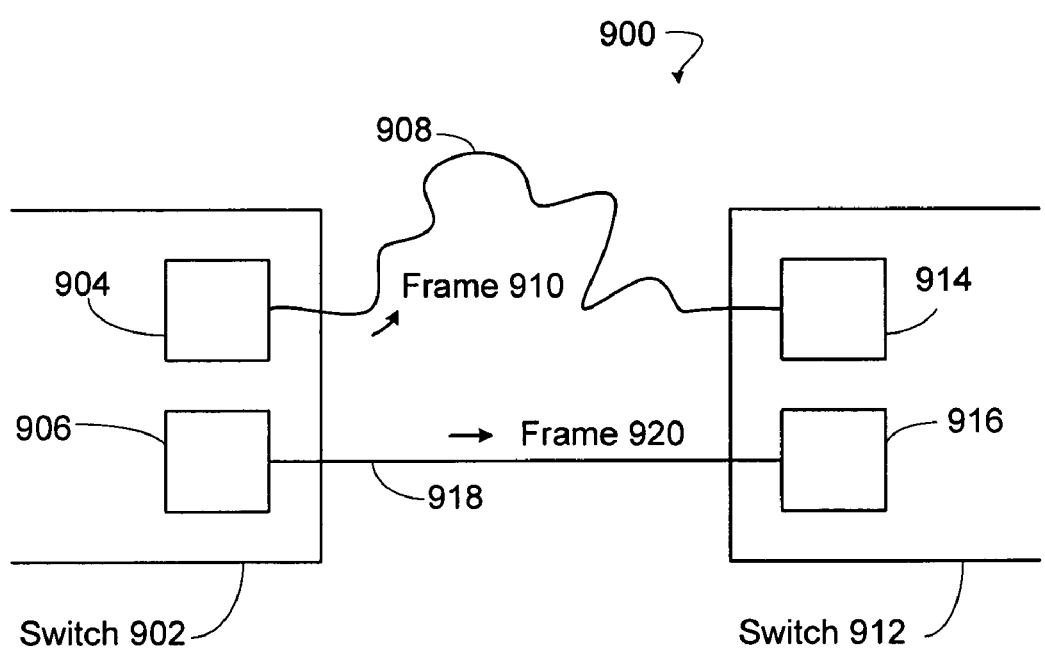
FIG. 11 is a block diagram of the difference in skew values between links of a trunked group.

For example, reference is made to FIG. 11 to describe a goal of maintaining in order delivery of frames transferred amongst switches. In the embodiment of FIG. 11, a trunked group 900 is shown between two switches 902, 912. The first switch 902 includes two E_Ports 904 and 906. A second switch 912 includes two E_Ports 914 and 916. Port 904 is communicatively coupled to port 914 via ISL 908 (link 908), while port 906 is coupled to port 916 via ISL 918 (link 918). By way of example, the length of time for a frame 910 to traverse link 908 is three (3) µseconds, and the length of time for a frame 920 to traverse link 918 is one (1) µsecond. Frame 910 must be transmitted in order before frame 920. If at time $T_0$ frame 910 is transmitted from port 904 to port 914 along ISL 908, it will arrive at port 914 three (3) µseconds later. If at time $T_1$, a frame 920 is transmitted from port 906 along ISL 918, it will arrive at port 916 one (1) µsecond later. Thus, the transmission of frame 920 at port 906 must be delayed and launched no earlier than 2.1 µseconds after launching frame 910 from port 904. Doing so prevents the frame 920 from arriving at switch 912 before frame 910 does, and allows in order delivery of frames between switches 902 and 912 to be maintained. It is noted that in the situation where the transmitted frame does not require "in order" delivery at ports 914 or 916, such frame is preferably launched from either ports 904 or 906 as early as possible. Accordingly, if there is no requirement for "in order" delivery amongst frames, frame 920 along link 918 will not be delayed after launching frame 910 along link 908.

C. An Embodiment for Identifying and Initializing Trunkable Switches and Ports

Figure 6:
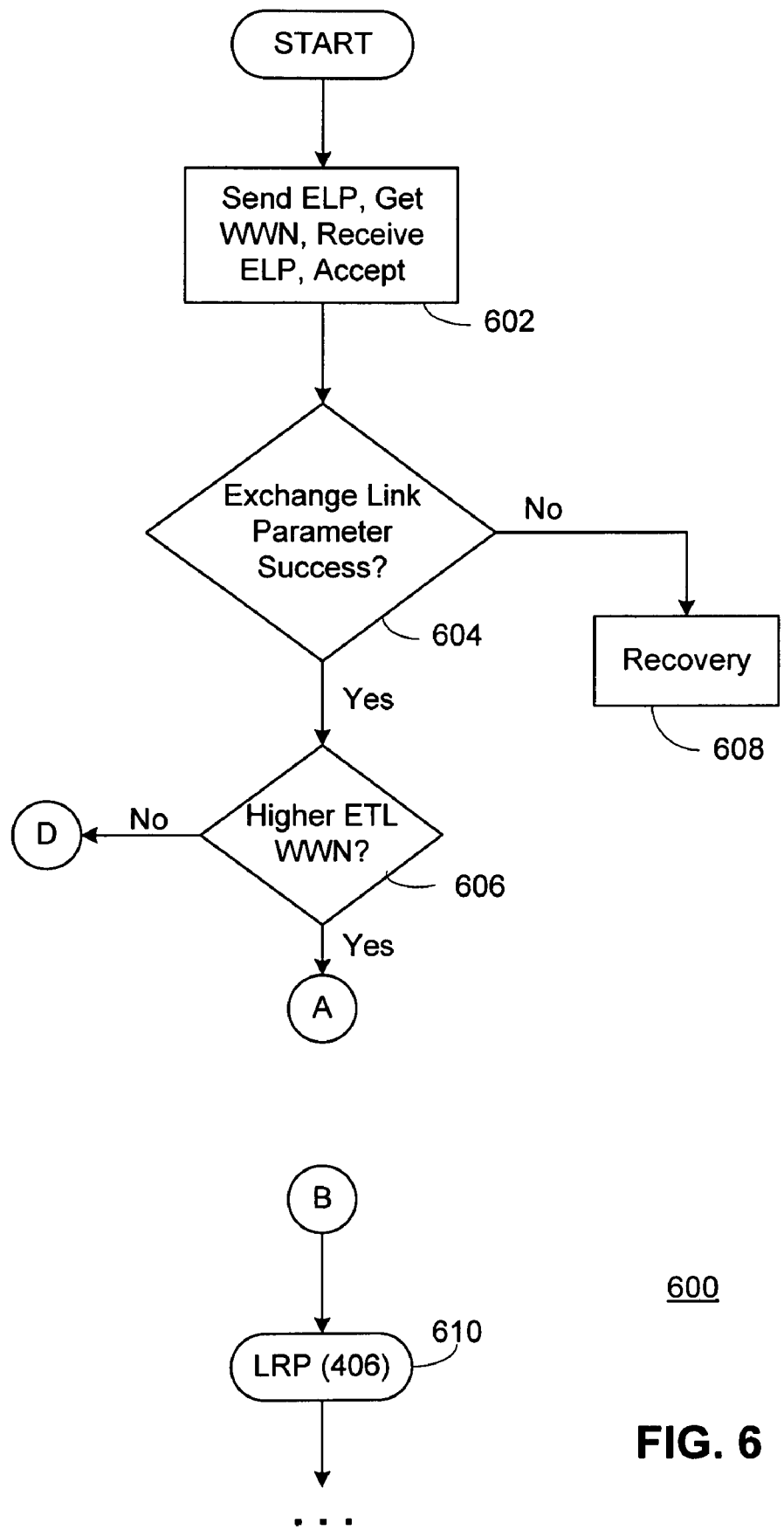
FIG. 6 is a flowchart showing one embodiment of the general data flow of conventional Fibre Channel initialization, and the identification and initialization of trunking ports.

The process of trunking in accordance with the present invention enables the even distribution of individual frames across a set of available paths (ISLs) while maintaining "in-order" delivery of frames. A trunkable switch is one that is capable of performing trunking operations to evenly distribute traffic across available ISLs, and as will be described subsequently, is communicatively coupled to an adjacent switch over ISLs that connect respective E_Ports which essentially communicate with the same speed (e.g., 2 Gbps). FIG. 6 illustrates a flowchart of the described embodiment of a process 600 of implementing the high level task application of trunk port identification and initialization, and the measurement of ISL latency. To provide further illustration and context when describing the process 600 of FIG. 6, reference will contemporaneously be made to FIGS. 3 and 4.

1. General Fibre Channel Fabric Initialization

Figure 4:
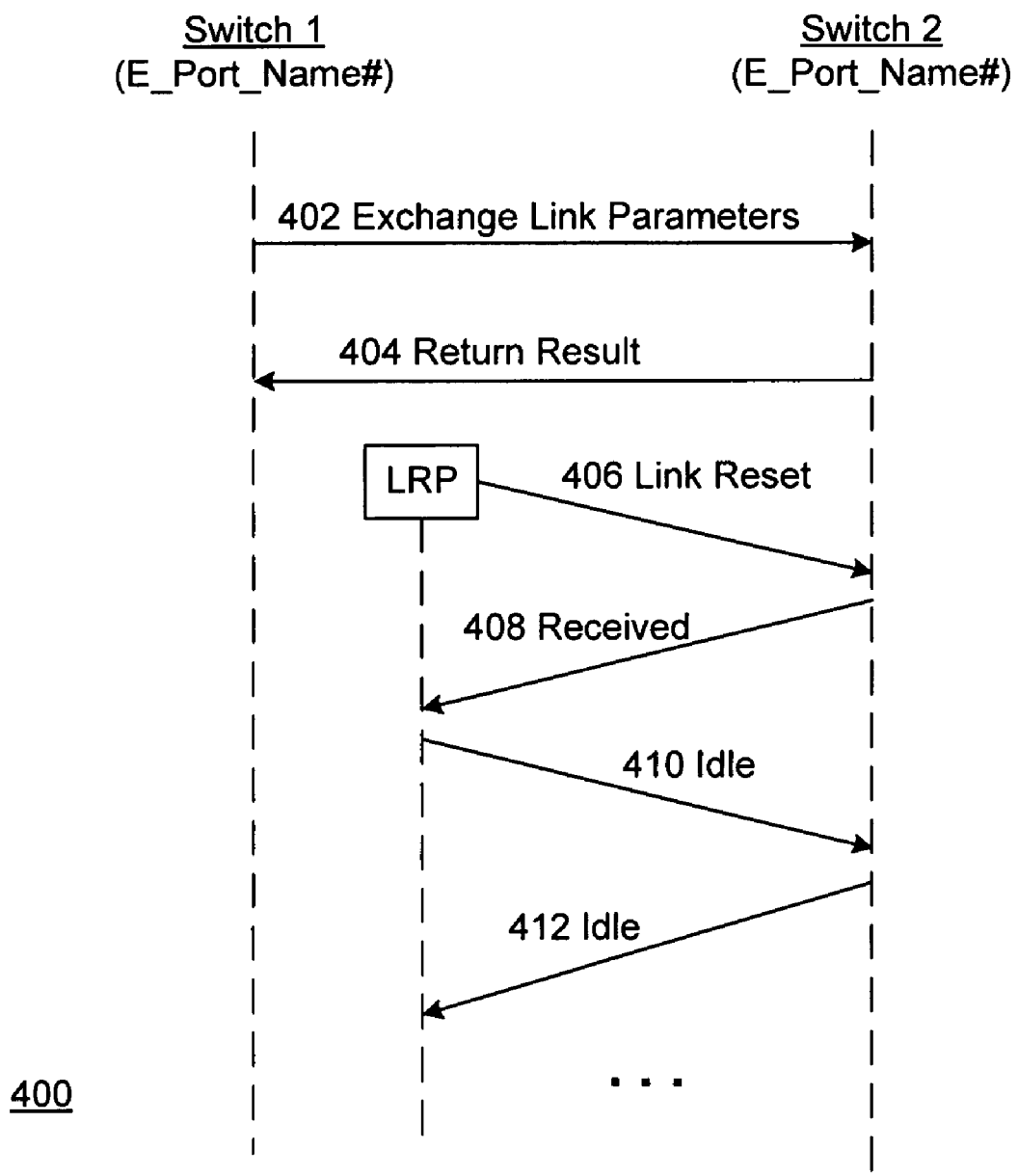
FIG. 4 is a sequence diagram indicating the general data flow of conventional fibre channel fabric initialization.

Referring to the sequence diagram of FIG. 4, a generalized process is shown for the fibre channel fabric initialization process as will be readily recognized by those skilled in the art and familiar with the fibre channel standard. Generally, to enable one switch (e.g., switch 1) to communicate with another switch (e.g., switch 2), several commands are exchanged during the fabric initialization handshake. For example, the switches can each asynchronously send a fabric internal link services (SW_ILS) request to each other. SW_ILS operates internal to the fabric between switches and is sent from one switch to another to initiate communication there between. For example, an exchange link parameters switch fabric internal link service (ELP SW_ILS) request can be sent 402 from switch 1 to switch 2. The ELP SW_ILS request is used to facilitate the exchange of link parameters between the two E_Ports coupled to an ISL (e.g., ISL 322 and E_Ports 306, 314 of FIG. 3). When link parameters are exchanged, the operating environment between the two E_Ports is established, as well as the capabilities of the switches 1 and 2 (e.g., 302, 304) that are connected by the E_Ports.

In response to receiving the ELP SW_ILS, switch 2 (e.g., 304) can respond 404 with a result. The result may represent a number of situations. For example, one result may be a switch fabric internal link accept (SW_ACC) sequence to notify switch 1 of the completion of the SW_ILS request. Should the SW_ILS request be rejected by switch 2, switch 2 returns 404 a result in the nature of a switch fabric internal link service reject (SW_RJT) sequence to switch 1. When this situation occurs, it is an indication of either the command code not being recognized or switch 2 expecting to receive a SW_ACC from switch 1.

Following the successful completion of the ELP, the Link Reset Protocol (LRP) is performed 406 to initialize flow control parameters. The LRP generally entails several steps 408-412, the details of which will become evident by those skilled in the art of the fibre channel standard.

Figure 7:
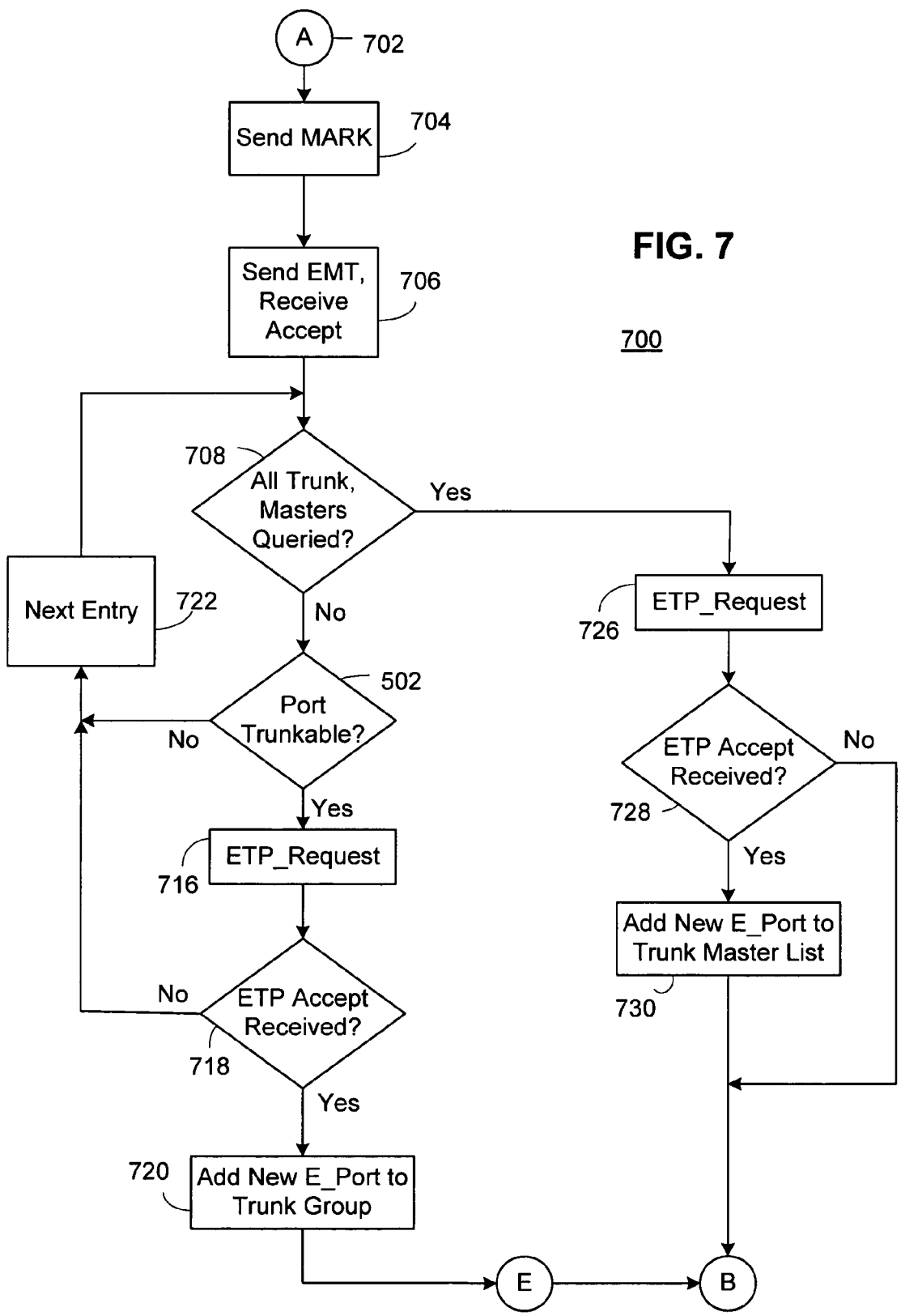
FIG. 7 is a flowchart showing an embodiment of a method of identifying and initializing an "initiating" E_Port as a trunking port (E_initiator) in accordance with the present invention.
Figure 8:
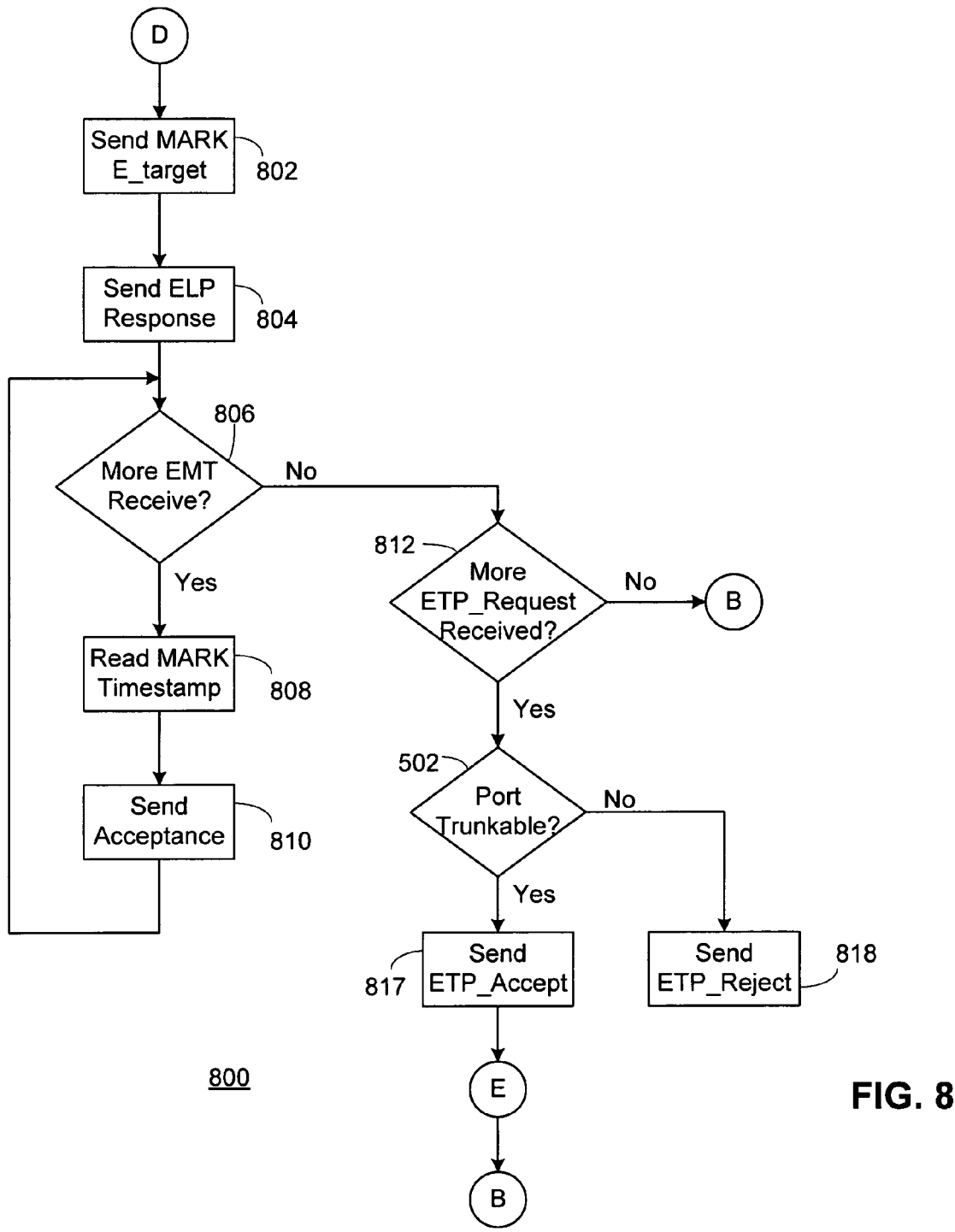
FIG. 8 is a flowchart showing a method of identifying and initializing a "target" E_Port as trunking port (E_target) in accordance with the present invention.

As previously mentioned, the present invention modifies the conventional fibre channel fabric initialization protocol previously described in FIG. 4 so as to implement a high level task application of trunk port identification and initialization and the measurement of ISL latency. In FIG. 6, step 602 indicates that the SW_ILS requests are performed by convention, including the ELP SW_ILS request 402. When a result to the ELP SW_ILS request is returned 404, a World Wide Name (WWN) associated with switch 2 is included. Thereafter, a determination 604 is made as to whether the ELP SW_ILS request successfully completed after an E_Port comes online. If so, then a determination 606 is made as to whether the present switch has a higher WWN than a switch interconnected via an ISL. If not, then the process D to be described with reference to FIG. 8 is undertaken; otherwise, the present invention determines whether the new E_Port can become a trunking port of a trunked group. This process is further described as process A when reference to FIG. 7 is undertaken before performing the Link Reset Protocol LRP (step 610). If however, the ELP SW_ILS request does not complete successfully (i.e., NO branch of 604), then various recovery and exception handling are performed 608 as will become evident to those skilled in the art of the fibre channel standard. Still referring to FIG. 6, reference to B indicates the return point from processes A and D, upon which the LRP process 406 of FIG. 4 is undertaken 610.

2. Fibre Channel Exchanges to Support Trunking

In order to enable trunking, it is preferable to add new SW_ILS into existing Fibre Channel protocols. Two exemplary SW_ILS's will now be described, namely Exchange Trunk Parameters (ETP) and Exchange Mark Timestamps (EMT), by way of example. In the discussions to follow, reference will be made to the particular implementation provided in Tables 1-3 by way of example only. It is noted that the present invention is not limited to the implementations of Tables 1-3, but will work suitably well with a variety of other parameters for ETP and EMT handling as well as other means of communicating required information.

A. Exchange Trunking Parameters (ETP)

In order to exchange potential trunked group information between two adjacent switches so that a mutually agreed set of ISLs can be trunked according to the trunking requirement, an Exchange Trunking Parameters (ETP) SW_ILS (used interchangeably with "ETP_request") is utilized. The Table 1 indicates exemplary parameters for the frame payload of an ETP_request. The frame header follows the standard fibre channel frame header requirements. The ETP_request includes the World Wide Name (WWN) of the port for the trunk master. This WWN indicates the trunked group that the port which is sending the ETP_request can potentially belong to.

TABLE 1

ETP_request Payload

| Field | Size in bytes |
|---|---|
| Opcode: IE_ETP = 0x91000000 | 4 |
| Trunking master port's port WWN | 8 |

It is preferable that only the successful ELP SW_ILS originator sends out an ETP_request. If an ETP_request fails to be delivered or an acknowledgement (e.g., ACK) is not received in the timeout period for error detection, a retry can be attempted. By doing so, a determination may be made as to whether a port is trunkable with a trunk master port. For example, if a reject indicator (e.g., SW_RJT) is received, the ETP_request is preferably not attempted again (i.e., retried) on the particular port. Optionally, a reason code (e.g., SW_RJT with code 0x3 (SW_LOGICAL_ERROR)) and a new reason explanation of the state "cannot trunk as requested" (e.g., 0x30 (SW_CANT_TRUNK)) can be included. Otherwise, if the ETP_request is successfully completed, then a switch acceptance indicator is sent (e.g., SW_ACCEPT) as an acknowledgment. As will be described in more detail subsequently, one implementation for determining whether to send a reject indicator as an acceptance indicator can be based on a set of criteria used for determining whether an E_Port is trunkable with an existing trunk master port.

B. Exchange Mark Timestamp (EMT)

To accurately measure an ISL's deskew timer value, both switches 302, 304 communicatively coupled to the ISL should be involved. For example, one switch 302 sends the MARK primitive sequence, while the other switch 304 "clocks" the timer value when the sequence is received. An Exchange MARK Timestamp (EMT) SW_ILS (used interchangeably with "EMT_request") instruction is used to retrieve the closed timer value of the MARK primitive sequence. One embodiment for defining an EMT_request payload is indicated in Table 2 as follows.

TABLE 2

EMT Request Payload

| Field | Size in bytes |
|---|---|
| opcode: IE_EMT = 0x900000 | 3 |
| size of timestamp in payload | 1 |
| port0's WWN | 8 |
| other E-port connected to port 0's WWN | 8 |
| timestamp for port0 | 4 |
| port1's WWN, if port1 is E-port | 8 |
| other E-port connected to port 1's WWN | 8 |
| timestamp for port1 | 4 |
| port2's WWN, if port2 is E-port | 8 |
| other E-port connected to port 2's WWN | 8 |
| timestamp for port2 | 4 |
| port3's WWN, if port3 is E-port | 8 |
| other E-port connected to port 3's WWN | 8 |
| timestamp for port3 | 4 |

A payload of an EMT_request preferably includes the EMT command code and MARK primitive timestamp for all E_ports connected to the same switch as the requesting port, and also satisfying the underlying hardware constraint for the ports to be trunkable with the requesting port. One retry of the EMT should be attempted after a first request fails to be delivered or is acknowledged (e.g., ACK). An attempt to retry the EMT_request should not be made if a reject (i.e., SW_RJT) is received.

The response to the EMT request comprises one of the following two types of responses. The first type of response is a reject (e.g., SW_RJT), which is typically accompanied by a reason code (e.g., SW_INVALID_COMMAND). This response will be received from a disabled trucking port. A second type of response indicates an acceptance (e.g., SW_ACC) of the playload. The following Table 3 illustratively lists one embodiment for the payload, the size of which may at a minimum be 24 bytes. A return payload includes those records of all ports that could potentially be trunkable with the port that received the EMT_request. For example, each record may be 20 bytes long, having the port WWN of both E_ports coupled to the ISL and a MARK timestamp.

TABLE 3

EMT Accept Payload

| Field | Size in bytes |
|---|---|
| opcode: IE_ACC = 0x200000 | 3 |
| size of timestamp in payload | 1 |
| port0's WWN | 8 |
| other E-port connected to port 0's WWN | 8 |
| timestamp for port0 | 4 |
| port1's WWN, if port1 is E-port | 8 |
| other E-port connected to port 1's WWN | 8 |
| timestamp for port1 | 4 |
| port2's WWN, if port2 is E-port | 8 |
| other E-port connected to port 2's WWN | 8 |
| timestamp for port2 | 4 |
| port3's WWN, if port3 is E-port | 8 |
| other E-port connected to port 3's WWN | 8 |
| timestamp for port3 | 4 |

3. Determining Whether a Port is Trunkable

Figure 5:
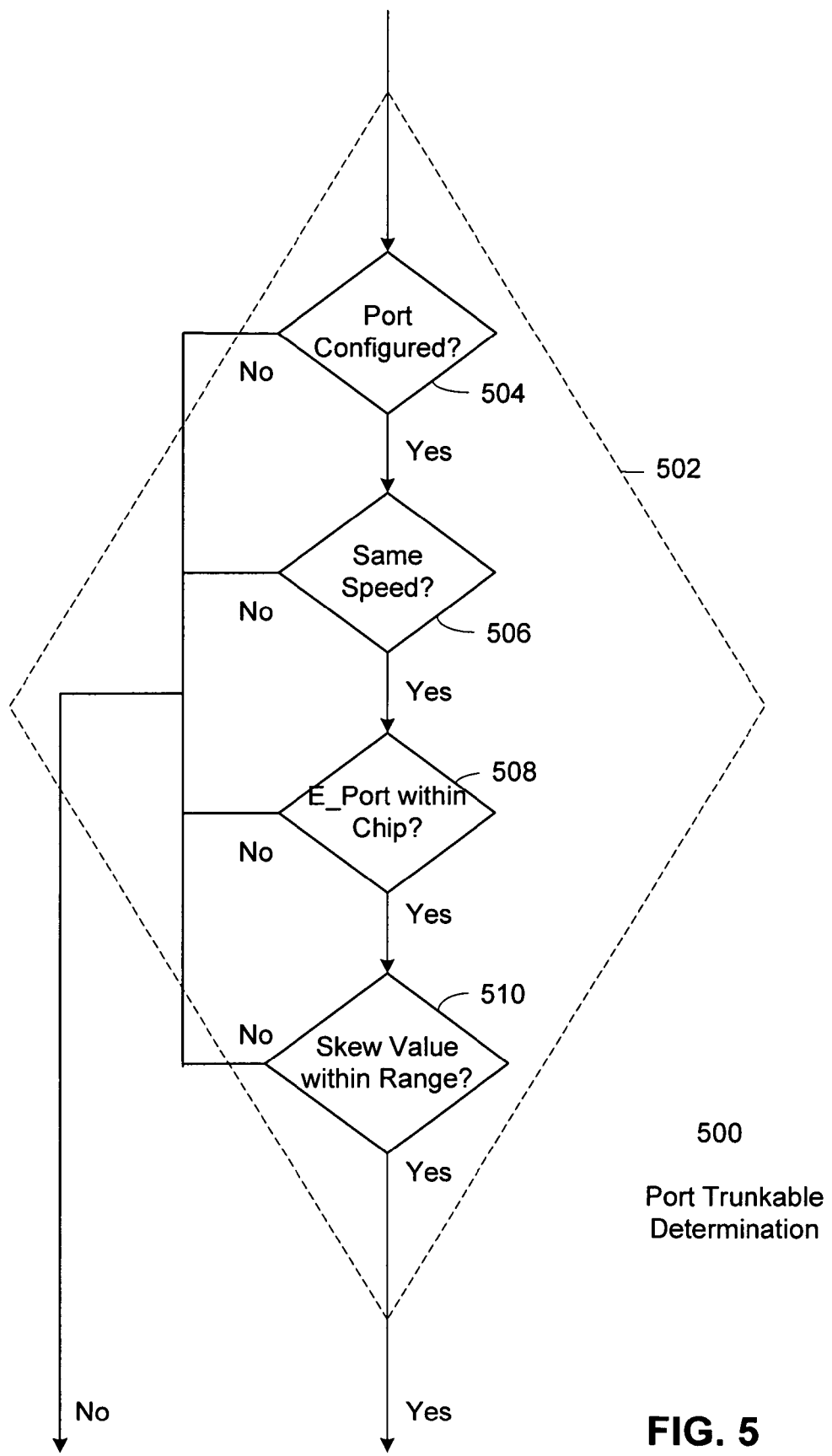
FIG. 5 is a flowchart showing a method to determine whether a port is a trunkable port.

Reference is now made to FIG. 5 and the following four sub-sections to describe a process 500 for determining whether a port is trunkable with existing trunk master ports.

In FIG. 5, a determination 502 (shown in broken line) is made as to whether an E_Port A can be trunked with a particular existing trunk master port, E_Port B, according to a set of four conditions to be described subsequently in more detail. It will become apparent from the discussion to follow that when all four conditions are satisfied, the YES branch of determination 502 is undertaken, otherwise the NO branch is undertaken. The significance of the YES and NO branches of determination 502 will also become apparent upon further discussion to follow.

A. Determining Whether a Port is Configured as Trunkable

A switch performs an inquiry 504 as to whether the port is configured as a trunking port. In step 504, it will be appreciated that the configuration of a port as a trunking port may be performed by the system administrator.

B. Determining a Port Data Rate

Second, a determination must be made as to whether 506 the E_Port A runs at the same link speed (e.g., 2 Gbps, or 1 Gbps) as the trunk master of interest.

C. Determining the Underlying Hardware Constraints

Third, E_Port A must reside 508 in the same group of four ports within a chip as the trunking master port of interest. This inquiry 508 corresponds to the relationship between ISL ports. With this third inquiry 508, a determination is made as to whether the new E_Port resides on the same chip as the supporting trunked group. It should be noted that the chip and quantity of four ports discussed here are mentioned for illustrative purposes only and as a particular implementation by way of example; the present invention works suitably with other configurations. In this particular implementation, trunking is supported for ports within a single four port group of the switch at each end of a trunked group. Consequently, if four links (ISLs) are to be used as a trunked group, the four E_Ports in each switch (e.g., 302, 304) must all reside within the same ASIC for that switch.

D. Determining Link-To-Link Skew

Fourth, the "one way skew value" between all ports in a trunked group 300 must be within a predetermined range 510. Determination 510 is directed to whether the "one way skew value" between links (ISLs) is sufficiently small to enable the hardware implementation to accommodate the time differential when launching multiple frames across ISLs and in which "in-order" delivery must be maintained. The "one way skew" is the difference in time it takes for different links to send frames from switch to switch. For example, if one ISL takes 10 microseconds and another ISL takes 11 microseconds, then the skew between the two ISLs is 1 microsecond.

As will be described subsequently in more detail, a method for accurately measuring the ISL deskew time value in both the initiator and target switches involves MARK primitive sequences being launched simultaneously among potential trunkable ports between both switches. When the MARK primitive sequences are received by either side of the switch, timer values for the arrival of the sequences may be clocked so as to measure the link-to-link skew.

4. Process Flow of Identifying and Initializing Trunkable Initiator and Target E_Ports The process of identifying and initializing trunking ports will now be further discussed post ELP SW_ILS 402 and 404 and prior to LRP 406, as per FIG. 4. Referring back to FIG. 6, the new E_Port that completes the ELP SW_ILS successfully, 602 and 604, and is associated with a higher World Wide Name (WWN) 606 is referred to as the E_initiator. The E_initiator completes those sub-process steps 700 for ascertaining whether the E_initiator is a trunking master port (E_master) or can join an existing trunked group, as indicated in FIG. 7 (and designated by process (A)). This implies that the E_Port in the connected switch has a lower WWN and is referred to as the E_target. Otherwise in step 606, regarding the E_target, the sub-process steps 800 indicated in FIG. 8 (and designated by process (D)) are performed to enable the E_target to respond to the E_initiator. Thereafter, sub-processes 700 and 800 may be used to determine whether the E_initiator or E_target may be considered as a trunking master port or a corresponding trunking slave port.

Reference is now made to the flowchart of FIG. 7 to describe the sub-process 700 of the E_initiator examining the list of existing trunking master ports within the same switch, and determining one at a time, whether the E_initiator port can be combined with the trunked master port within a trunk master group.

As E_Ports are processed one at a time, it is reasonable to assume that the first E_initiator to execute sub-process 700, that is, the first E_initiator to complete ELP SW_ILS (e.g. E_Port 306) is a likely candidate to become a trunking master port, by itself. For example, a new E_initiator can be added to the list of trunking ports; a list may be used to keep track of those trunking ports (e.g., T_master), and initially, the list would be empty. As new E_Ports 308, 310, 312, 314, 316, 318 and 320 are added to the list of trunking ports, the size of the trunked group 300 is incrementally increased.

In order to obtain the link-to-link skew measurement, a MARK primitive sequence is sent 704 from all potential trunking ports (e.g., 306-312) at the same time to the ports 314-320 of target switch 304. Doing so enables the measurement of the "one way skew value" for all potential trunking ports to be obtained. When the target switch 304 receives the special MARK primitive sequences, a register (i.e., part of components 344) residing on switch 304 records or measures (i.e., clocks) the time. Subsequently in step 706, the MARK timestamp is obtained by using the method previously described wherein the new SW_ILS Exchange MARK Timestamp (EMT) is sent with the trunking target MARK timestamp, which is included in the payload. The EMT request is used to fetch the MARK timestamps for calculating the "one way skew values" measured by switch 302 for the use of switch 304. The EMT response generated by switch 304 contains the measurement obtained by switch 304, which is returned to switch 302 to enable switch 302 to determine the "one way skew value," as indicated in step 706.

At step 708, a determination is made as to whether any trunking master ports have already been established in the switch. If a trunking master port has already been established, then several inquiries are made so that "in-order" delivery of frames on the ISL is preserved, as will be described below with respect to the NO branch of 708. Otherwise, if no trunking master ports have been established on the switch, then the YES branch of 708 is invoked so that the new E_Port can be added to the switch's list of trunking master ports, as will also be discussed subsequently.

For each existing trunking master port, a determination is made as to whether the particular E_initiator can be trunked with an existing trunked group 502. In order to reach this determination, reference is made back to FIG. 5, where E_initiator is checked against several requirements for step 502. First, a determination 504 is made as to whether the port is configured as a trunking port. Second, the E_initiator must run 506 the same link speed (e.g., 2 Gbps, or 1 Gbps) as all other links in the trunked group. Third, E_initiator must reside 508 in the same chip. Fourth, the "one way skew value" between all ports in a trunked group must be within a predetermined range 510. When all four conditions are satisfied, E_initiator can be potentially added to the trunked group as indicated by the YES branch of step 502 in FIG. 7. To do so, an ETP_request is sent 716 (e.g., ETP SW_ILS) to the target switch 304. If a switch acceptance indicator is sent by the target switch, like an ETP_accept response (e.g., SW_ACCEPT) as an acknowledgment, and is received 718, the E_initiator is added 720 to the trunked group associated with the particular trunking master port.

If the conditions of step 502 are not satisfied, then the NO branch of determination 502 is undertaken. As an example, if a determination is made that the skew value is not within the predetermined range, then the NO branch is taken. It is noted that failure of any of the determinations 504, 506, 508 and 510 will generally lead to the Reject indicator 514 being produced, upon which the next trunk master 722 is queried at step 708.

Referring back to step 718, if the response to the ETP_request received is a Rejection, then the procedure will be initiated with other potential trunking master ports, as depicted by the NO branch of step 718 and the reference 722 to the next trunk master entry in FIG. 7.

Referring back to step 708, if the entire list of trunking master ports have been examined and the E_initiator could not be combined into an existing trunked group, then the YES branch is undertaken so that the new E_Port can be added to a list of trunking master ports. Thereafter, an ETP_request is sent 726 from switch 302 to switch 304. When an acknowledgment (i.e., acceptance) is received 728 by switch 302 from switch 304, the E_initiator can become 730 the trunking master port by itself. If the acknowledgment is a Reject, then trunking will not be enabled for the port.

Adding E_initiator to the trunked group 720 associated with the particular trunking master port can be accomplished in a manner consistent with updating the entire trunked group. For example, based on the MARK timestamps obtained from the other port, the Deskew Timer Constant value may be calculated for each existing trunking port in the trunked group, and the entire trunked group may be updated, as indicated by the reference to process E in FIG. 7.

Figure 9:
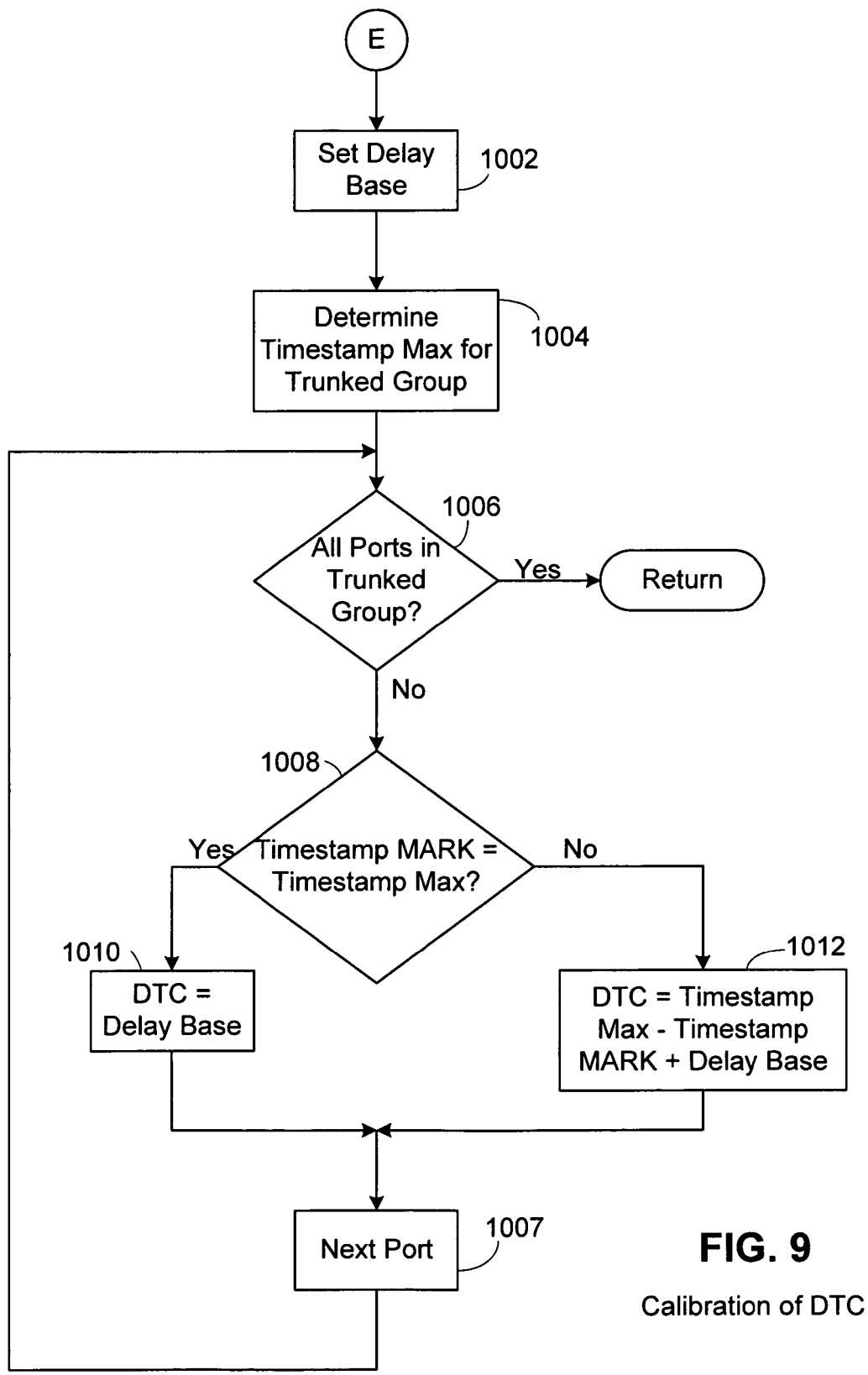
FIG. 9 is a flowchart showing an embodiment of a method of calibrating the Deskew Timer Constant in accordance with the present invention.

Reference is now made to FIG. 9 to describe the process of calibrating the deskew timer constant (DTC). At step 1002, a base delay is set (e.g., three words time). At step 1004, the maximum value of the MARK time stamp for the trunked group is determined. For example, this can be accomplished by determining which has a greater value, the current maximum MARK timestamp parameter for the trunked group, or the MARK timestamp for the new E_Port. Next, for each port 1006, 1007 in the trunking group, if it is determined that the MARK timestamp is equal 1008 to the maximum MARK timestamp for the trunked group, then the DTC for the port is set 1010 to the base delay value. Otherwise, the difference between the maximum value of the MARK timestamp for the trunked group and the MARK timestamp of the particular ISL is determined. This difference represents the difference in propagation delay across ISLs between the two switches. This time differential must be added to the base delay value in order to determine 1012 the DTC, representative of the magnitude of the total frame delivery skew between paths. They are used to setup the Deskew Timer Constant (DTC) register described previously. When all ports within the trunked group are processed in the above manner, the YES branch of step 1006 is taken. The return step in FIG. 9 passes control to step B in FIG. 7, upon which LRP 610 (406) is continued, as shown in FIG. 6.

Referring back to FIG. 6, when a result to an ELP SW_ILS request is returned and a higher WWN does not exist in step 606, the sub-process 800 of FIG. 8 is undertaken as indicated by reference to process D. Turning to FIG. 8, a flow chart of the sub-process 800 for identifying and initializing the trunking target port (E_target) on switch 304 is depicted. By comparison to the process in FIG. 7, the sub-process of FIG. 8 is initiated when the port has a lower WWN (i.e., E_target), as indicated by reference to the NO branch of 606 in FIG. 6. In FIG. 8, for each 802 E_target that is about to complete ELP (but prior to sending SW_ACC), MARKs are simultaneously sent from switch 304 on all ISLs, with which the E_target could potentially be trunked. Thereafter, sub-process 800 is responsive to step 706 of FIG. 7 where EMT SW_ILS has been sent by switch 302 to fetch the MARK time stamps. The MARK timestamps that were recorded in switch 304's hardware as a result of the E_initiative 302 sending the MARKs in step 704, are read 808 by switch 304. The MARK timestamps and WWN information are returned in an acknowledgment sent 810 (e.g., SW_ACC) back to switch 302.

Thereafter, for each ETP_request received 812 from switch 302 via step 716, several determinations are made according to the port trunkable 502 criteria of FIG. 5. First, a determination is made as to whether the port is configured as a trunking port. Second, the E_target must run at the same link speed (e.g., 2 Gbps, or 1 Gbps) as all other links in the trunked group. Third, E_target must reside in the same chip. Fourth, the "one way skew value" between all ports in a trunked group must be within a predetermined range. When these conditions are satisfied so that a determination is made as to whether the E_target is trunkable, a corresponding acknowledgment (e.g., ETP_accept) is sent 817, and control is passed to processes E and B as previously described. Otherwise, a failure acknowledgment (e.g., ETP_reject) is sent 818 back in response to the ETP_request 716 sent by switch 302. It is noted that a failure of any of the four conditions queried in step 502 will also result in a failure acknowledgement 818.

Accordingly, the present invention is intended to embrace all such alternatives, modifications and variations as fall within the spirit and scope of the appended claims and equivalents.

What is claimed is:

1. In a communication network system having at least a first switch and a second switch communicatively coupled together by a plurality of links, the first switch having at least a plurality of first ports, and the second switch having at least a plurality of second ports, each of the links communicatively coupling one of the first ports to a corresponding one of the second ports, a method of routing frames received at the first switch to the second switch, the method comprising:
   selecting a new port from the first and second ports;
   adding the new port to a trunked group in response to determining whether the new port qualifies as a trunking port;
   selecting a pair of trunking ports to be trunking master ports; and
   responsive to the first switch receiving frames, the trunking master ports selectively controlling the frames routed over the trunked group to the second switch.

2. The method according to claim 1, wherein the first ports and the second ports comprise E-Ports.

3. The method according to claim 1, wherein selecting a new port from the first and second ports comprises:
   sending a request to exchange link parameters associated with the new port;
   receiving a response for the request, the response including a first identifier;
   determining whether a second identifier exists, the second identifier having a higher value than the first identifier; and
   determining whether the link parameters exchanged successfully.

4. The method according to claim 3, wherein the first identifier and the second identifier each comprises a World Wide Name.

5. The method according to claim 1, wherein determining whether the new port qualifies as a trunking port comprises:
   determining a one way skew value for the links associated with the trunked group; and
   determining whether the new port can be added to the trunked group based on the one way skew value determined.

6. The method according to claim 5, wherein adding the new port to a trunked group comprises:
   determining whether the new port is configured as a trunked port;
   determining whether a link associated with the new port communicates frames at a speed substantially similar to other links in the trunked group;
   verifying that the new port resides on one of the first and second switches; and
   determining that the one way skew value is within a predetermined range.

7. The method according to claim 5, wherein determining a one way skew value comprises:
   measuring a difference in propagation delay between the links associated with the trunked group.

8. The method according to claim 1, wherein selecting a pair of trunking ports to be banking master ports comprises:
   determining that the new port does not belong to an existing trunked group; and
   designating the new port as a trunking master port.

9. The method according to claim 1, wherein the trunking master ports selectively controlling the frames routed over the trunked group to the second switch comprises:
   associating one of a plurality of lists with each of the first ports; and
   binding one of the lists associated with a trunking master port to a corresponding one of the links in the trunked group for a time period, the time period enabling a frame to be transmitted from the first switch to the second switch, and received at the second switch with "in order" delivery.

10. The method according to claim 1, wherein one of the pair of trunking master ports comprises a transmit port routing the frames over the trunked group.

11. The method according to claim 10, wherein the other of the pair of trunking master ports comprises a receive port queuing frames received over the trunked group.

12. The method according to claim 1, wherein the new port is added to the trunked group prior to performing a Link Reset Protocol during a fabric initialization process.

13. A communication network system, comprising:
   at least a first switch and a second switch communicatively coupled together by a plurality of links;
   a plurality of first and second ports, the first ports being coupled to the first switch and the second ports being coupled to second switch, each of the selected ones of the links having a pair of ends coupled to corresponding ones of the first ports and the second ports;
   grouping logic to determine if a new port selected from the first and second ports qualifies to have the associated link join a group and adding the link associated with the new port to the group in response to determining that the new port qualifies; and
   a pair of transmit and receive ports selected respectively from one of the first ports associated with a link in the group, the transmit port routing frames received at the first switch across the group to the second switch.

14. The system according to claim 13, further comprising:
first queuing logic coupled to the transmit port, the first queuing logic enabling frames received at the first ports to be routed through the transmit port and across the group so that the selected ones of the links transmit the frames in an evenly-distributed manner.

15. The system according to claim 14, further comprising:
second queuing logic coupled to the receive port, the second queuing logic enabling frames routed across the group to be received at the second switch according to an order of arrival.

16. The system according to claim 15, further comprising:
a timer binding a particular list associated with the transmit port to a particular link in the group for a period of time to ensure "in-order" delivery of frames transmitted across the group.

17. The system according to claim 16, wherein the timer comprises:
a programmable timeout constant register.

18. The system according to claim 16, wherein the first ports and the second ports comprise E-Ports.

19. The system according to claim 16, wherein the links comprise ISLs.

20. The system according to claim 16, further comprising a one way link timer.

21. The system according to claim 16, further comprising:
a Fibre Channel fabric, the first switch and the second switch forming a part of the fabric.

22. In a communication network system having at least a first switch and a second switch communicatively coupled together by a plurality of links, the first switch having at least a plurality of first ports, and the second switch having at least a plurality of second ports, each of the links communicatively coupling one of the first ports to a corresponding one of the second ports, a method for transmitting frames from the first switch to the second switch, the method comprising:
selecting a new port from the plurality of first ports;
adding the new port to a trunked group in response to determining that the new port qualifies as a trunking port;
receiving frames for transmission to the second switch at the first switch in order;
queuing the received frames for transmission to the second switch;
evenly distributing the queued frames between the first ports in the trunked group; and
transmitting the queued frames from the plurality of first ports in the trunked group to the corresponding second ports so that the frames are received at the corresponding second ports in order as received at the first switch.

23. The method of claim 22, further comprising:
determining skew values for the plurality of links, and
wherein said transmitting of frames uses the determined skew values to control timing of the transmission of the frames.

24. The method of claim 23, wherein the skew values are one way skew values.

25. The method of claim 23, wherein the first and second switches are Fibre Channel switches and the plurality of links are Fibre Channel links.

26. A system for transmitting frames between two network devices, the system comprising:
a first network device having a plurality of first ports;
a second network device having a plurality of second ports; and
a plurality of links connecting said plurality of first ports of said first network device to corresponding of said plurality of second ports of said second network device,
wherein said first network device includes:
grouping logic to determine if a new port selected from said plurality of first ports qualifies as a trunking port and adding said new port to a trunked group if said new port qualifies as a trunking port;
queuing logic for queuing frames to be transmitted to said second network device;
distribution logic for evenly distributing the queued frames between said first ports in said trunked group; and
transmitting logic for transmitting the queued frames from said first ports in said trunked group over said plurality of links so that frames are received at said corresponding second ports of said second network device in order.

27. The system of claim 26, wherein said first and second network devices include:
cooperating logic to determine the skew value between said plurality of links connecting said plurality of first and second ports, and
wherein said transmitting logic uses said skew value to control timing of the transmission of the frames.

28. The system of claim 27, wherein the skew value is a one way skew value.

29. The system of claim 27, wherein said first and second network devices are Fibre Channel devices and wherein said plurality of links are Fibre Channel links.

30. The system of claim 27, wherein the skew value is a one way skew value.

31. The system of claim 27, wherein said first and second network devices are Fibre Channel devices and wherein said plurality of links are Fibre Channel link.

32. The system of claim 26, wherein said first and second network devices include:
cooperating logic to determine the skew value between said plurality of links, and
wherein said transmitting logic uses said skew value to control timing of the transmission of the frames.

33. A first network device for connection to a second network device, the second network device having a plurality of second ports, with a plurality of links connected to the plurality of second ports of the second network device, the first network device comprising:
a plurality of first ports for connection to the plurality of links and corresponding of the plurality of second ports;
grousing logic to determine if a new port selected from said plurality of first ports qualifies as a trunking port and adding said new port to a trunked group if said new port qualifies as a trunking port;
queuing logic for queuing the frames to be transmitted to the second network device;
distribution logic for evenly distributing the queued frames between said first ports in said trunked group; and
transmitting logic for transmitting the queued frames from said first ports in said trunked group over said plurality of links so that frames are received at the corresponding second ports of second network device in order.

34. The first network device of claim 33, further comprising:
skew logic to cooperate with the second network device to determine the skew value between the plurality of links, and
wherein said transmitting logic uses skew value to control timing of the transmission of frames.

35. The first network device of claim 33, wherein the first network device is a Fibre Channel device.

36. A system for transmitting frames between two network devices, the system comprising:
- a host computer;
- a storage unit;
- a first network device having a plurality of first ports and coupled to said host computer;
- a second network device having a plurality of second ports and coupled to said storage unit; and
- a plurality of links connecting said plurality of first ports of said first network device to corresponding of said plurality of second ports of said second network device, wherein said first network device includes:
- grouping logic to determine if a new port selected from said plurality of first ports qualifies as a trunking port and adding said new port to a trunked group if said new port qualifies as a trunking port;
- queuing logic for queuing frames to be transmitted to said second network device;
- distribution logic for evenly distributing the queued frames between said first ports in said trunked group; and
- transmitting logic for transmitting the queued frames from said first ports in said trunked group over said plurality of links so that frames are received at said corresponding second ports of said second network device in order.

* * * * *